United States Patent
Cobb et al.

(10) Patent No.: US 10,096,235 B2
(45) Date of Patent: Oct. 9, 2018

(54) ALERT DIRECTIVES AND FOCUSED ALERT DIRECTIVES IN A BEHAVIORAL RECOGNITION SYSTEM

(71) Applicant: Omni AI, Inc., Dallas, TX (US)

(72) Inventors: Wesley Kenneth Cobb, The Woodlands, TX (US); Ming-Jung Seow, Houston, TX (US); Gang Xu, Katy, TX (US); Kishor Adinath Saitwal, Houston, TX (US); Anthony Akins, West Columbia, TX (US); Kerry Joseph, Pearland, TX (US); Dennis G. Urech, Katy, TX (US)

(73) Assignee: Omni AI, Inc., Houston, TX (US)

( * ) Notice: Subject to any disclaimer, the term of this patent is extended or adjusted under 35 U.S.C. 154(b) by 1290 days.

(21) Appl. No.: 13/839,587

(22) Filed: Mar. 15, 2013

(65) Prior Publication Data

US 2013/0242093 A1  Sep. 19, 2013

Related U.S. Application Data

(60) Provisional application No. 61/611,284, filed on Mar. 15, 2012.

(51) Int. Cl.
*H04N 7/18* (2006.01)
*G08B 29/18* (2006.01)
(Continued)

(52) U.S. Cl.
CPC ....... *G08B 29/185* (2013.01); *G06K 9/00369* (2013.01); *G06K 9/00771* (2013.01);
(Continued)

(58) Field of Classification Search
CPC . H04N 7/002; G06K 9/00771; G06F 3/04842
(Continued)

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

| CN | 101557506 A | 10/2009 |
| CN | 101901334 A | 12/2010 |

(Continued)

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Jamie Atala
*Assistant Examiner* — Masum Billah
(74) *Attorney, Agent, or Firm* — NW Poulsen; L A McAnelly

(57) ABSTRACT

Alert directives and focused alert directives allow a user to provide feedback to a behavioral recognition system to always or never publish an alert for certain events. Such an approach bypasses the normal publication methods of the behavioral recognition system yet does not obstruct the system's learning procedures.

21 Claims, 6 Drawing Sheets

(51) Int. Cl.
  *G08B 23/00* (2006.01)
  *G06K 9/00* (2006.01)
  *H04N 7/00* (2011.01)
  *G06K 9/32* (2006.01)
  *G06K 9/62* (2006.01)
  *G06K 9/52* (2006.01)
  *G08B 21/18* (2006.01)
  *G08B 13/196* (2006.01)

(52) U.S. Cl.
  CPC ....... *G06K 9/00778* (2013.01); *G06K 9/3241* (2013.01); *G06K 9/52* (2013.01); *G06K 9/6254* (2013.01); *G08B 21/182* (2013.01); *G08B 23/00* (2013.01); *H04N 7/002* (2013.01); *G08B 13/19608* (2013.01)

(58) Field of Classification Search
  USPC ........................................................ 343/143
  See application file for complete search history.

(56) References Cited

U.S. PATENT DOCUMENTS

| | | | |
|---|---|---|---|
| 5,748,775 | A | 5/1998 | Tsuchikawa et al. |
| 5,751,378 | A | 5/1998 | Chen et al. |
| 5,969,755 | A | 10/1999 | Courtney |
| 6,088,468 | A | 7/2000 | Ito et al. |
| 6,252,974 | B1 | 6/2001 | Martens et al. |
| 6,263,088 | B1 | 7/2001 | Crabtree et al. |
| 6,570,608 | B1 | 5/2003 | Tserng |
| 6,661,918 | B1 | 12/2003 | Gordon et al. |
| 6,674,877 | B1 | 1/2004 | Jojic et al. |
| 6,678,413 | B1 | 1/2004 | Liang et al. |
| 6,856,249 | B2 | 2/2005 | Strubbe et al. |
| 6,940,998 | B2 | 9/2005 | Garoutte |
| 7,076,102 | B2 | 7/2006 | Lin et al. |
| 7,136,525 | B1 | 11/2006 | Toyama et al. |
| 7,158,680 | B2 | 1/2007 | Pace |
| 7,200,266 | B2 | 4/2007 | Ozer et al. |
| 7,227,893 | B1 | 6/2007 | Srinivasa et al. |
| 7,436,887 | B2 | 10/2008 | Yeredor et al. |
| 7,825,954 | B2 | 11/2010 | Zhang et al. |
| 7,868,912 | B2 | 1/2011 | Venetianer et al. |
| 2003/0107650 | A1 | 6/2003 | Colmenarez et al. |
| 2003/0228058 | A1 | 12/2003 | Xie et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0162515 | A1* | 7/2005 | Venetianer .......... G06F 17/3079 348/143 |
| 2005/0240629 | A1 | 10/2005 | Gu et al. |
| 2006/0018516 | A1 | 1/2006 | Masoud et al. |
| 2006/0056655 | A1* | 3/2006 | Wen et al. .................... 382/103 |
| 2006/0138338 | A1 | 6/2006 | Tezuka et al. |
| 2006/0165386 | A1 | 7/2006 | Garoutte |
| 2006/0190419 | A1 | 8/2006 | Bunn et al. |
| 2006/0193516 | A1 | 8/2006 | Toyama et al. |
| 2006/0222206 | A1 | 10/2006 | Garoutte |
| 2006/0227997 | A1 | 10/2006 | Au et al. |
| 2007/0250898 | A1 | 10/2007 | Scanlon et al. |
| 2008/0002856 | A1 | 1/2008 | Ma et al. |
| 2008/0181453 | A1* | 7/2008 | Xu ........................ G06T 7/2006 382/103 |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0247599 | A1 | 10/2008 | Porikli et al. |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |
| 2010/0150471 | A1 | 6/2010 | Cobb et al. |
| 2010/0322516 | A1 | 12/2010 | Xu et al. |
| 2013/0243252 | A1 | 9/2013 | Xu et al. |

FOREIGN PATENT DOCUMENTS

| | | |
|---|---|---|
| EP | 0 749 098 A2 | 5/1996 |
| WO | 200949314 A2 | 4/2009 |
| WO | 2010055205 A1 | 5/2010 |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

International Search Report for PCT Application No. PCT/US2013/032075 dated Jun. 28, 2013.

Office Action Issued in corresponding application Chinese Application No. 201380019203.9; dated Feb. 16, 2016 (27 pages).

* cited by examiner

ALERT DIRECTIVES AND FOCUSED ALERT DIRECTIVES IN A BEHAVIORAL RECOGNITION SYSTEM

CROSS-REFERENCE TO RELATED APPLICATIONS

This application claims priority to U.S. provisional application having Ser. No. 61/611,284, filed on Mar. 15, 2012.

BACKGROUND

Field of the Invention

Embodiments of the present invention generally relate to configuring a behavioral recognition-based video surveillance system to generate alerts for certain events. More specifically, the embodiments provide techniques allowing a behavioral recognition system to identify events that should always or never result in an alert without impeding the unsupervised learning process of the surveillance system.

Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of predefined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event." Such surveillance systems typically require that the objects and/or behaviors which may be recognized by the system be defined in advance. Thus, in practice, these systems rely on predefined definitions for objects and/or behaviors to evaluate a video sequence. More generally, such systems rely on predefined rules and static patterns and are thus often unable to dynamically identify objects, events, behaviors, or patterns, much less even classify them as either normal or anomalous.

On the other hand, a behavioral recognition system is a type of video surveillance system that may be configured to learn, identify, and recognize patterns of behavior by observing a sequence of individual frames, otherwise known as a video stream. Unlike rules-based video surveillance systems, a behavioral recognition system instead learns objects and behavioral patterns by generalizing video input and building memories of what is observed. Over time, a behavioral recognition system uses these memories to distinguish between normal and anomalous behavior captured in the field of view of a video stream. Upon detecting anomalous behavior, the behavioral recognition system publishes an alert to a user notifying the user of the behavior. After several recurrences of a particular event, the behavioral recognition system learns that the event is non-anomalous and ceases publishing subsequent alerts. For example, a behavioral recognition system focused on a building corridor may initially publish alerts each time an individual appears in the corridor at a certain time of day within the field of view of the camera. If this event occurs a sufficient amount of times, the behavioral recognition system may learn that this is non-anomalous behavior and stop alerting a user to this event.

However, although in a plurality of cases this is how a user expects such a system to work, in some instances, the user may want the behavioral recognition system to always publish an alert for a particular behavioral event. Returning to the previous example, if the corridor were of limited access, security personnel may want to be notified each time someone appears in the corridor to ascertain that only people in the corridor are the ones authorized to be there. Conversely, the user may not ever want the behavioral recognition system to publish an alert for a particular behavior. This situation may arise where the event occurs often but infrequently enough to result in an alert. For example, a behavioral recognition system focused on a room in a building that is next to a construction site may create alerts whenever construction vehicles pass through the field of view of the camera outside a window in the room. In this instance, security personnel may not want the behavioral recognition system to ever alert on these occurrences.

Behavioral recognition systems by their very nature avoid the use of predefined rules wherever possible in favor of unsupervised learning. Thus, approaching a solution for these issues requires a natural method for providing feedback to a behavioral recognition system regarding what behaviors should the system either always or never result in an alert.

SUMMARY

One embodiment of the invention provides a method for alerting a user to behavior corresponding to an alert directive. This method may generally include obtaining characteristic values from an observed event in a scene. This method may also include parsing a list of alert directives for a matching alert directive having ranges of criteria values. If the characteristic values are within the ranges of the criteria values, then the observed event corresponds to a a matching alert directive. This method may also include upon identifying the matching alert directive, alerting the user to the observed event.

Additionally, the characteristic values of the observed event may be a pixel-height value, a pixel-width value, and an x- and y-coordinate center position of a foreground object. The characteristic values may also be a set of x- and y-coordinates corresponding to a trajectory of a foreground object. Further, the matching alert directive may have a focus mask that intersects with a region in the scene where the observed event occurred.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present invention are attained and can be understood in detail, a more particular description, briefly summarized above, may be had by reference to the embodiments illustrated in the appended drawings.

It is to be noted, however, that the appended drawings illustrate only typical embodiments of this invention and are therefore not to be considered limiting of its scope, for the disclosure may admit to other equally effective embodiments.

DETAILED DESCRIPTION

Figure 1:
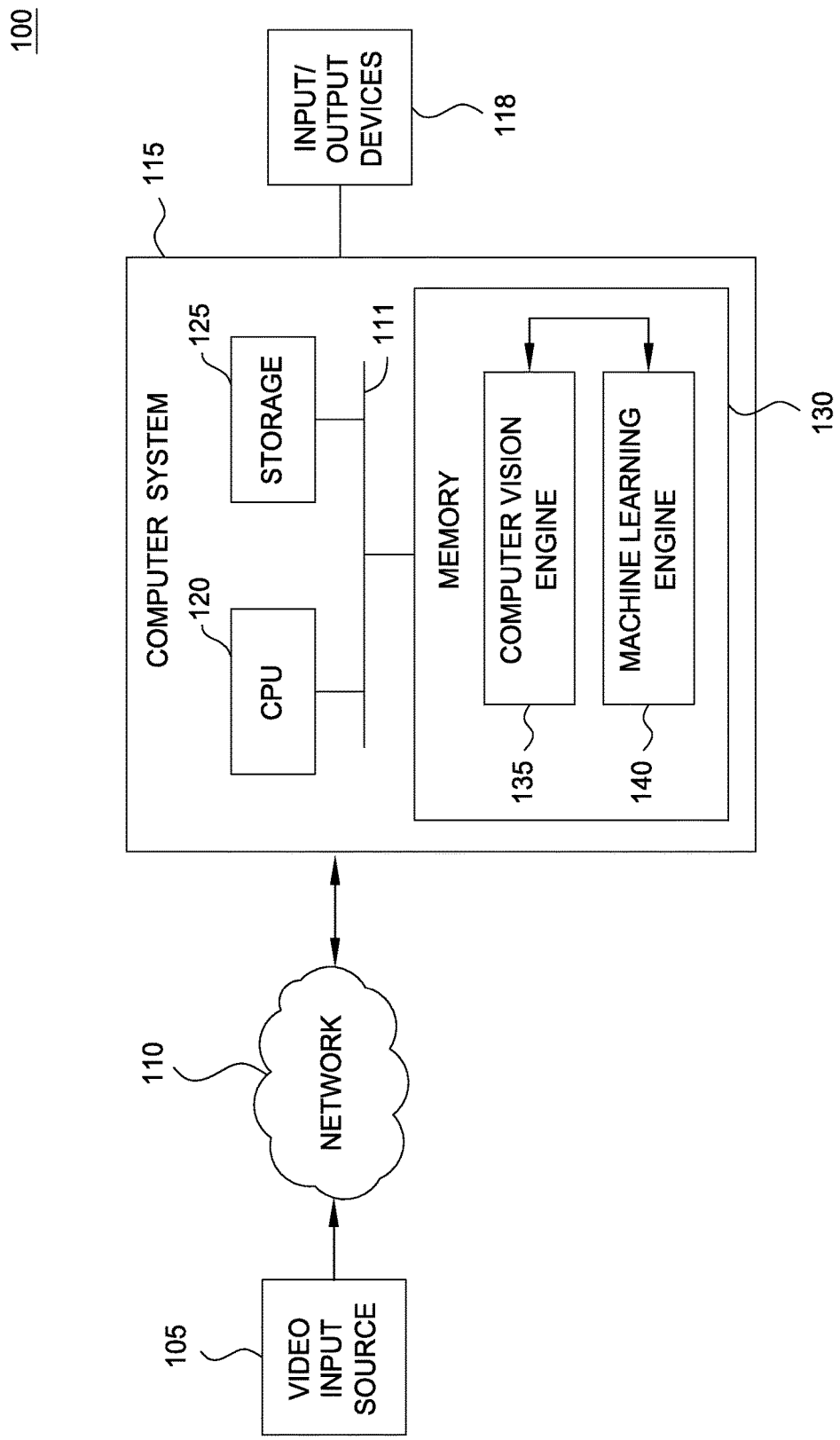
FIG. 1 illustrates components of a video analysis system, according to one embodiment.

Embodiments of the invention disclosed herein provide techniques for creating alert directives and focused alert directives in a behavioral recognition-based video surveillance system. That is, the disclosed techniques allow a user of a behavioral recognition system to identify previously alerted behavior that should always or never result in a subsequent alert. Because alert directives override only the behavioral recognition system's normal alert publication procedures (which take place after the system has already performed its learning procedures), this approach does not disrupt the behavioral recognition system's unsupervised learning.

In one embodiment, a behavioral recognition system includes a computer vision engine and a machine learning engine. The computer vision engine may be configured to process a field of view captured within a video stream. This field of view is generally referred to as the "scene." In processing, the computer vision engine separates foreground objects (e.g., objects resembling people, vehicles, etc.) from background objects (e.g., objects resembling pavement, the sky, etc.). After processing the scene, the computer vision engine may generate information streams of observed activity (e.g., appearance features, kinematic features, etc.) and pass the streams to the machine learning engine. In turn, the machine learning engine may be configured to learn object behaviors in the scene using that information. In addition to learning-based behavior, a machine learning engine may be configured to build models of certain behaviors within a scene and determine whether observations indicate that the behavior of an object is anomalous, relative to the model. Upon detecting anomalous behavior, the machine learning engine generates an alert. After determining that the alert should be published, the behavioral recognition system publishes the alert to a user interface. The user interface may contain a database of previously issued alerts that are generally accessible to a user of the system. The user can view these alerts as a list, where each list item displays information of the alert and may include corresponding video or image data.

After publishing a sufficient number of alerts for a particular behavioral event, the machine learning engine learns the event is a non-anomalous occurrence and ceases to publish subsequent alerts for the event. In one embodiment, a user may create an alert directive to override the normal alert publication process. An alert directive allows a user to provide feedback to the machine learning engine to either always or never create an alert for a certain behavioral event. The machine learning engine consults a list of alert directive definitions after learning information streams relating to an event and before evaluating the event for anomalous behavior. Thus, alert directives do not hinder the machine learning engine's learning procedures.

To create an alert directive, a user selects an event occurrence or an alert previously generated by the system to use as a template. For example, a user may parse through a database of previous alerts for a scene, characterized based on time, type, name, event, or otherwise, as well as view underlying video of the activity that caused the alert. In one embodiment, a user may do this via a dialog box in an alert browser on the user interface. After selecting an alert, the user defines alert directive matching criteria. In one embodiment, the criteria may include whether the behavior should always or never result in an alert, how frequently the alert should be published (e.g., in situations where the behavior results in numerous alerts within a short time span), and whether the machine learning engine should match behaviors or object types (or both). Once the user has defined the matching criteria, the user interface creates an alert directive in the alert database with references pointing back to the original alert used to create it. Thereafter, the user interface sends information about the alert directive to the machine learning engine.

Note that matching an alert directive to alert behavior by the machine learning engine may depend on both the alert type and series of parameters specified by a user. For example, once a user selects an alert to use for an alert directive, the corresponding video of that alert may show a person in front of the security door, along with a bounding box indicating the pixels classified by the system as depicting that person. In such a case, a graphical editor may allow a user to adjust the bounding box around the person in the selected alert to adjust the tolerances for the alert directive—creating a range, e.g., for the center (x,y) position of a foreground object, etc. Similarly, a user may specify another bounding box for the relative position of the person in front of the door, i.e., a tolerance for object position. By adjusting a tolerance size and pose of a person and for the position of such a person, an alert directive may be used to specify a region in front of the security door, so that whenever any person is observed to be present, the machine learning engine creates an alert. Thus, this approach allows for variation in height, position, width, speed, etc., of observed objects to still satisfy the alert directive definitions.

In a further embodiment, an alert directive may be expanded to provide a focused alert directive. This approach extends the cases where the machine learning engine can apply an alert directive to behavioral events in the scene. For example, a camera may focus on a building corridor with multiple security doors. In such a case, a user must create and tune a separate alert directive for each door to be alerted whenever someone appears in front of a door. As an alternative, a focused alert directive allows the user to create both an alert directive (e.g., for a person appearing in front of the security door) and a focus mask specifying different regions in the scene which should result in an alert.

That is, rather than specifying a tolerance of a position of a person in front of a security door, the user can extend the tolerance in position to the full field of view. The user defines one or more regions of the scene where an alert should be generated when a foreground object otherwise within the tolerances of the alert directive is observed. For example, the alert of the person appearing in front of the first door (within the alert directive tolerances for height, width, and pose) defines an alert directive, but the position is extended to be the entire field of view of the camera, intersected with the user-defined regions. So, to create a focused alert directive in the given example, where a camera is focused on an area with multiple security doors, the user would select a "person appears" alert for a person in front of any one of the doors, specify tolerances around the appearance of that person using a graphical editor, and then create a mask for a position of "person appears" alert to include the regions generally in front of each door.

Once a user creates an alert directive (or focused alert directive), the user interface sends information of the alert directive (and focus mask, if applicable) to the machine learning engine. When the machine learning engine processes information of subsequent events that matches an alert directive's match criteria and tolerances, the machine learning engine bypasses the normal publication methods of the behavioral recognition system and immediately publishes an alert or discards the event (given the matching criteria), irrespective of whether the machine learning engine regards the observed behavior as anomalous. This approach does not change the learned state regarding a particular scene or influence the undirected learning of the machine learning engine. In all cases, the machine learning engine has already performed its learning procedures before applying the alert directive.

In the following, reference is made to embodiments of the disclosure. However, it should be understood that the disclosure is not limited to any specifically described embodiment. Instead, any combination of the following features and elements, whether related to different embodiments or not, is contemplated to implement and practice what is disclosed. Furthermore, in various embodiments the present invention provides numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, any reference to "the invention" or "the disclosure" shall not be construed as a generalization of any inventive subject matter disclosed herein and shall not be considered to be an element or limitation of the appended claims except where explicitly recited in a claim(s).

One embodiment of the present invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., a hard-disk drive) on which alterable information is stored. Such computer-readable storage media, when carrying computer-readable instructions that direct the functions of the invention, are embodiments of the invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

FIG. 1 illustrates components of a video analysis and behavioral recognition system 100, according to one embodiment. As shown, the behavioral recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area within the camera's field of view is referred to as the scene. The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine learning engine 140. And in turn, the machine learning engine 140 may be configured to evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, cluster objects having similar visual and/or kinematic features, build semantic representations of events depicted in the video frames. The machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. Thereafter, the machine learning engine can decide whether the behavior of an observed event is anomalous or not based on prior learning.

Data describing whether a normal/abnormal behavior/event has been determined and/or what such behavior/event is may be provided to output devices 118 to issue alerts, for example, an alert message with corresponding video and image data presented on a GUI interface screen. Such output devices may also be configured with a database of previously issued alerts from which a user can create an alert directive.

In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 may analyze each frame in real-time to derive a set of kinematic and appearance data related to objects observed in the frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
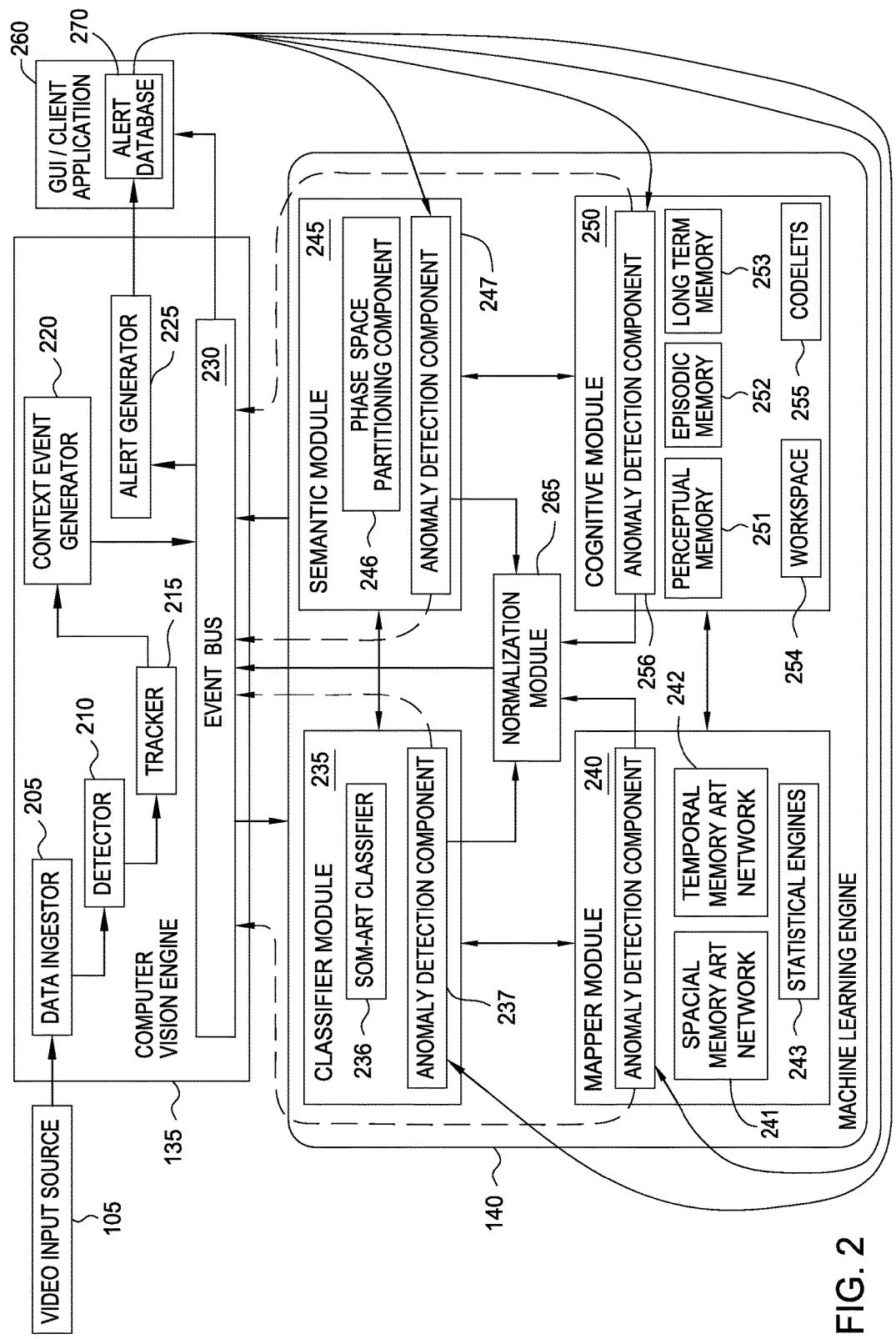
FIG. 2 further illustrates components of the video analysis system shown in FIG. 1, according to one embodiment.

FIG. 2 further illustrates components of the computer vision engine 135 and the machine learning engine 140 first illustrated in FIG. 1, according to one embodiment of the invention. As shown, the computer vision engine 135 includes a data ingestor 205, a detector 215, a tracker 215, a context event generator 220, an alert generator 225, and an event bus 230. Collectively, the components 205, 210, 215, and 220 provide a pipeline for processing an incoming sequence of video frames supplied by the video input source 105 (indicated by the solid arrows linking the components). In one embodiment, the components 210, 215, and 220 may each provide a software module configured to provide the functions described herein. Of course, one of ordinary skill in the art will recognize that the components 205, 210, 215, and 220 may be combined (or further subdivided) to suit the needs of a particular case and further that additional components may be added (or some may be removed) from a video surveillance system.

In one embodiment, the data ingestor 205 receives video input from the video input source 105. The data ingestor 205 may be configured to preprocess the input data before sending it to the detector 210. The detector 210 may be configured to separate each frame of video provided into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the detector 210 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the detector 210 may be configured to generate a mask used to identify which pixels of the scene are classified as depicting foreground and, conversely, which pixels are classified as depicting scene background. The detector 210 then identifies regions of the scene that contain a portion of scene foreground (referred to as a foreground "blob" or "patch") and supplies this information to subsequent stages of the pipeline. Additionally, pixels classified as depicting scene background may be used to generate a background image modeling the scene.

In one embodiment, the detector 210 may be configured to detect the flow of a scene. Once the foreground patches have been separated, the detector 210 examines, from frame-to-frame, any edges and corners of all foreground patches. The detector 210 will identify foreground patches moving in a similar flow of motion as most likely belonging to a single object or a single association of motions and send this information to the tracker 215.

The tracker 215 may receive the foreground patches produced by the detector 210 and generate computational models for the patches. The tracker 215 may be configured to use this information, and each successive frame of raw-video, to attempt to track the motion of an object depicted by a given foreground patch as it moves about the scene. That is, the tracker 215 provides continuity to other elements of the system by tracking a given object from frame-to-frame. It further calculates a variety of kinematic and/or appearance features of a foreground object, e.g., size, height, width, and area (in pixels), reflectivity, shininess rigidity, speed velocity, etc.

The context event generator 220 may receive the output from other stages of the pipeline. Using this information, the context processor 220 may be configured to generate a stream of context events regarding objects tracked (by tracker component 210). For example, the context event generator 220 may package a stream of micro feature vectors and kinematic observations of an object and output this to the machine learning engine 140, e.g., a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete. The context event generator 220 may also calculate and package the appearance data of every tracked object by evaluating the object for various appearance attributes such as shape, width, and other physical features and assigning each attribute a numerical score.

The computer vision engine 135 may take the output from the components 205, 210, 215, and 220 describing the motions and actions of the tracked objects in the scene and supply this information to the machine learning engine 140 through the event bus 230. Illustratively, the machine learning engine 140 includes a classifier 235, a semantic module 240, a mapper 245, cognitive module 250, and a normalization module 265.

The classifier 235 receives context events such as kinematic data and appearance data from the computer vision engine 135 and maps the data on a neural network. In one embodiment, the neural network is a combination of a self-organizing map (SOM) and an ART network, shown in FIG. 2 as a SOM-ART classifier 236. The data is clustered and combined by features occurring repeatedly in association with each other. Then, based on those recurring types, the classifier 235 defines types of objects. For example, the classifier 235 may define foreground patches that have, for example, a high shininess rigidity and reflectivity as a Type 1 object. These defined types then propagate throughout the rest of the system.

The mapper 240 may use these types by searching for spatial and temporal correlations and behaviors across the system for patches to create maps of where and when events are likely or unlikely to happen. In one embodiment, the mapper 240 includes a temporal memory ART network 241, a spatial memory ART network 242, and statistical engines 243. For example, the mapper 240 may look for patches of Type 1 objects. The spatial memory ART network 242 uses the statistical engines 243 to create statistical data of these objects, such as where in the scene do these patches appear, in what direction do these patches tend to go, how fast do these patches go, whether these patches change direction, and the like. The mapper 240 then builds a neural network of this information, which becomes a memory template against which to compare object behaviors. The temporal memory ART network 241 uses the statistical engines 243 to create statistical data based on samplings of time slices. In one embodiment, initial sampling occurs at every thirty minute interval. If many events occur within a time slice, then the time resolution may be dynamically changed to a finer resolution. Conversely, if fewer events occur within a time slice, then the time resolution may be dynamically changed to a coarser resolution.

In one embodiment, the semantic module 245 includes a phase space partitioning component 246. The semantic module 245 identifies patterns of motion or trajectories within a scene and analyzes the scene for anomalous behavior through generalization. By tessellating a scene and dividing the foreground patches into many different tessera, the semantic module 245 can traces an object's trajectory and learns patterns from the trajectory. The semantic module 245 analyzes these patterns and compares them with other patterns. As objects enter a scene, the phase space partitioning component 246 builds an adaptive grid and maps the objects and their trajectories onto the grid. As more features and trajectories are populated onto the grid, the machine learning engine learns trajectories that are common to the scene and further distinguishes normal behavior from anomalous behavior.

In one embodiment, the cognitive module 250 includes a perceptual memory 251, an episode memory 252, a long term memory 253, a workspace 254, and codelets 255. Generally, the workspace 254 provides a computational engine for the machine learning engine 140. For example, the workspace 240 may be configured to copy information from the perceptual memory 251, retrieve relevant memories from the episodic memory 252 and the long-term memory 253, select which codelets 255 to execute. In one embodiment, each codelet 255 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 255 may create, retrieve, reinforce, or modify memories in the episodic memory 252 and the long-term memory 253. By repeatedly scheduling codelets 255 for execution, copying memories and percepts to/from the workspace 240, the machine learning engine 140 performs a cognitive cycle used to observe, and learn, about patterns of behavior that occur within the scene.

In one embodiment, the perceptual memory 251, the episodic memory 252, and the long-term memory 253 are used to identify patterns of behavior, evaluate events that transpire in the scene, and encode and store observations. Generally, the perceptual memory 251 receives the output of the computer vision engine 135 (e.g., a stream of context events). The episodic memory 252 stores data representing observed events with details related to a particular episode, e.g., information describing time and space details related on an event. That is, the episodic memory 252 may encode specific details of a particular event, i.e., "what and where" something occurred within a scene, such as a particular vehicle (car A) moved to a location believed to be a parking space (parking space 5) at 9:43 AM.

In contrast, the long-term memory 253 may store data generalizing events observed in the scene. To continue with the example of a vehicle parking, the long-term memory 253 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 253 stores observations about what happens within a scene with much of the particular episodic details stripped away. In this way, when a new event occurs, memories from the episodic memory 252 and the long-term memory 253 may be used to relate and understand a current event, i.e., the new event may be compared with past experience, leading to both reinforcement, decay, and adjustments to the information stored in the long-term memory 253, over time. In a particular embodiment, the long-term memory 253 may be implemented as an ART network and a sparse-distributed memory data structure. Importantly, however, this approach does not require the different object type classifications to be defined in advance.

In one embodiment, modules 235, 240, 245, and 250 include an anomaly detection component, as depicted by components 237, 244, 247, and 256. Each anomaly detection component is configured to identify anomalous behavior, relative to past observations of the scene. Further, each component is configured to receive alert directive and focus mask information from alert database 270. Generally, if any anomaly detection component identifies anomalous behavior, the component generates an alert and passes the alert through the normalization module 265. For instance, anomaly detector 247 in the semantic module 245 detects unusual trajectories using learned patterns and models. If a foreground object exhibits loitering behavior, for example, anomaly detection component 247 evaluates the object trajectory using loitering models, subsequently generates an alert, and sends the alert to the normalization module 265. Upon receiving an alert, the normalization module 265 evaluates whether the alert should be published based on the alert's rarity relative to previous alerts of that alert type. Once the normalization module 265 determines that the alert should be published, it passes the alert to the alert generator 225 (through event bus 230).

However, if an anomaly detection component identifies an event that matches an alert directive, then rather than evaluating the event for anomalous behavior, the anomaly detector component instead follows the match criteria of the alert directive. If the alert directive requires that an alert be published, the anomaly detection component sends an alert to the alert generator 225 (through event bus 230). Otherwise, the anomaly detection component discards the event. Note that in either case, the anomaly detection component does not send any information to the normalization module 265 if the event data matches an alert directive.

In one embodiment, the alert generator 225 resides in the computer vision engine 135. The alert generator 225 receives alert information from the anomaly detection components 237, 244, 247, and 256 and the normalization module 265. The alert generator 225 publishes alert information to the GUI/client device 260. The GUI/client device stores this alert information in the alert database 270. The alert database 270 contains previously issued alerts and may be accessible to a user of the GUI/client device 270.

Figure 3:
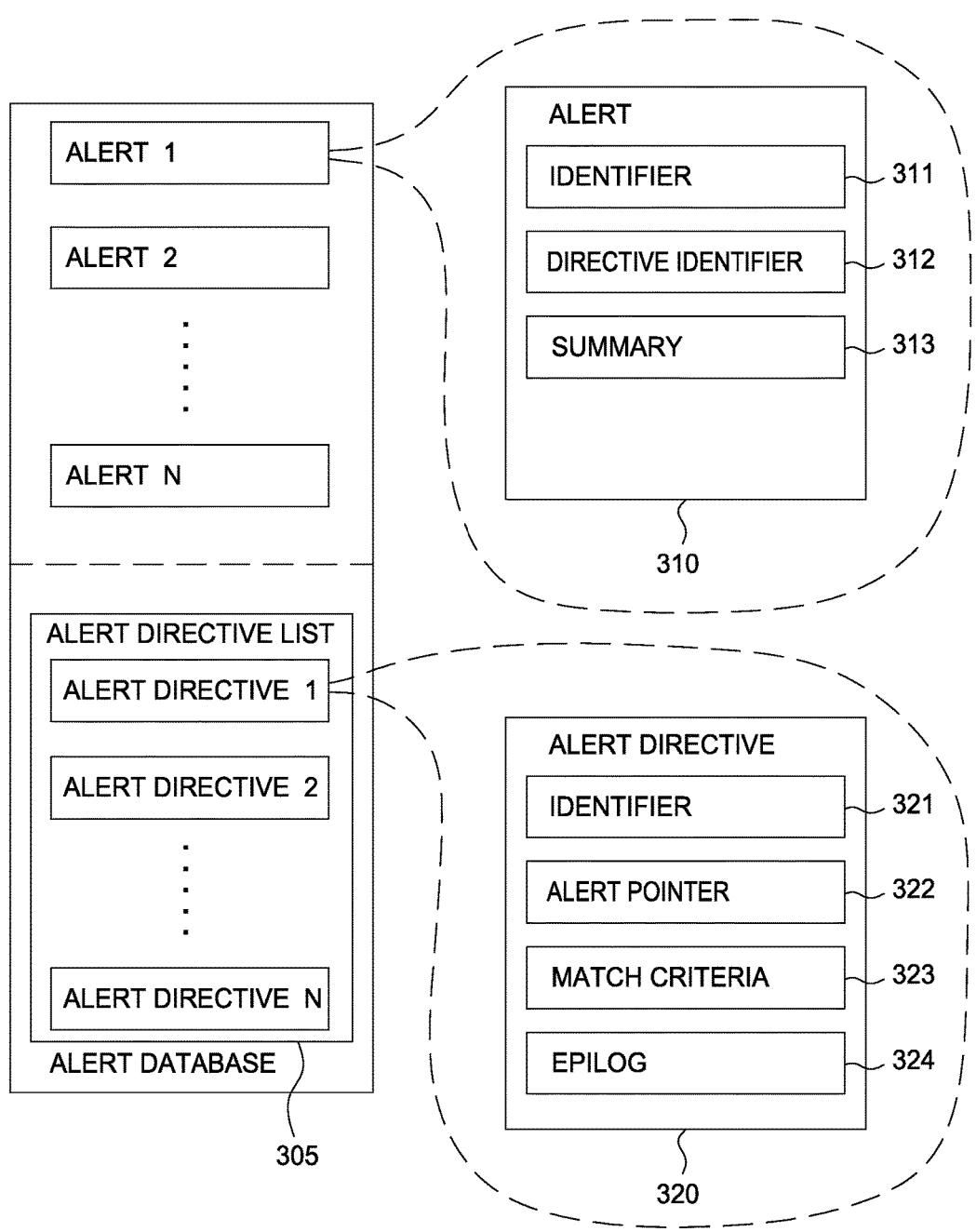
FIG. 3 illustrates an example of an alert database in a client device, according to one embodiment.

FIG. 3 illustrates an example of an alert database 300 in a client device, according to one embodiment. The alert database 300 stores previously issued alerts that a user may parse through to create an alert directive. As shown, the alert database 300 includes a plurality of alerts and an alert directive list 305. Each alert 310 includes an identifier 311, a directive identifier 312, and a summary 313. The identifier 311 is a unique numerical value assigned to the alert 310. The directive identifier 312 is a numerical field that indicates whether the alert 310 has been assigned an alert directive.

The summary 313 is a data-payload that contains a concise description of the data characterizing the alert. The summary 313 may include information about the type of anomaly, what time the anomaly occurred, height and width values and an x- and y-coordinate of an object (if the anomaly occurred at a point in time), a set of x- and y-coordinates corresponding to a trajectory (if the anomaly occurred over a series of frames), and the like. Alert directives evaluate object behaviors or object types (or both) that match the information provided in the summary 313.

The alert directive list 305 includes a plurality of alert directives. Each alert directive 320 has an identifier 321, an alert pointer 322, match criteria 323, and an epilog 324. The identifier 321 of the alert directive is a unique numerical value assigned to an alert directive. Alert pointer 322 is a pointer to the original alert to which the alert directive corresponds. By pointing to the original alert, the alert directive 320 can access the data provided by summary 313. In one embodiment, the information contained in summary 313 may be stored as a data packet in a corresponding alert directive 320.

Match criteria 323 contains user-specified information of how the alert directive should process a certain event, such as whether the machine learning engine should publish an alert or discard the behavior, and whether to match an alert directive to a behavior or to an object type (or both). For example, if a user chooses to disregard matching behavior for an "unusual location" alert, the machine learning engine may create alerts for an object at rest at the location specified by the alert directive, and it may create alerts for an object moving rapidly through the same location. As another example, if a user chooses to disregard types in matching for an "unusual location" alert, the machine learning engine may create alerts for a object corresponding to a learning based classification type 1 (e.g., a car) positioned at the location, and the machine learning engine may also create alerts for an object corresponding to a learning based classification type 2 (e.g., a person) positioned at the location.

The epilog 324 is an array of tolerance values of each corresponding alert characteristic in the data provided by summary 313. Tolerances provide the machine learning engine with flexibility in matching object behaviors and types to an alert directive, as the likelihood of matching two objects having the same characteristics (height, width and the center (x,y) position) in a scene is very low. In one embodiment, a user defines these tolerances by using a graphical editor on a selected alert. By drawing a bounding box around the object that triggered the alert, the user can adjust the tolerances for the alert directive, creating a range for several characteristics of the selected alert (e.g., for the heights and widths of the object).

Figure 4:
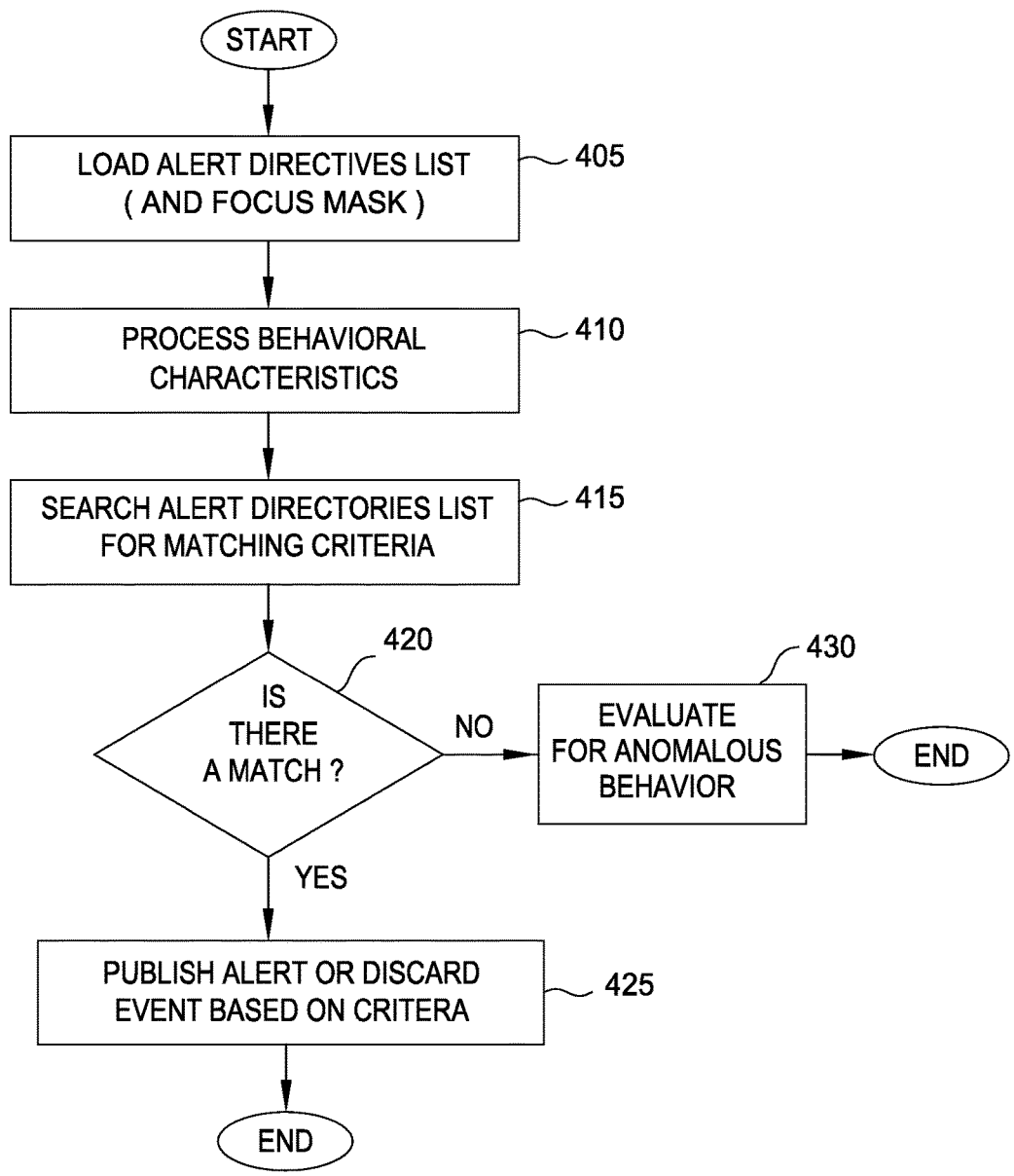
FIG. 4 illustrates a method for publishing alerts in a behavioral recognition system configured with alert directives and focused alert directives, according to one embodiment.

FIG. 4 is a method 400 for publishing alerts in a behavioral recognition system configured with alert directives, according to one embodiment. The method 400 begins at step 405, where the machine learning engine loads an alert directives list (and a focus mask, if applicable). In one embodiment, the machine learning engine loads the alert directives list at system startup. Additionally, when a user creates an alert directive after startup has occurred, the user interface sends information of the alert directive to the machine learning engine. At step 410, the machine learning engine processes a behavioral event. For instance, the machine learning engine may process information generated by the computer vision engine corresponding to a person standing at a point in the scene. By this point, the machine engine has completed its learning procedures. At step 415, the machine learning engine searches the alert directives list to determine whether the behavior corresponds to an alert directive based on matching criteria. If there is a matching alert directive (step 425), then the machine learning engine bypasses the normal publication process and publishes an alert to the user interface. In the ongoing example, the alert directives list may include a directive to always issue an "unusual location" alert for any person (i.e., an object model corresponding to a person) standing in certain position of a scene, given tolerances for height, width, and the person's central (x,y) position. If the observed person's height and width and location coordinates match with the alert directive, the behavioral recognition system immediately publishes an "unusual location" alert. However, if there is no matching alert directive (step 430), the machine learning engine proceeds with the normal publication process and evaluates the event for anomalous behavior.

Figure 5:
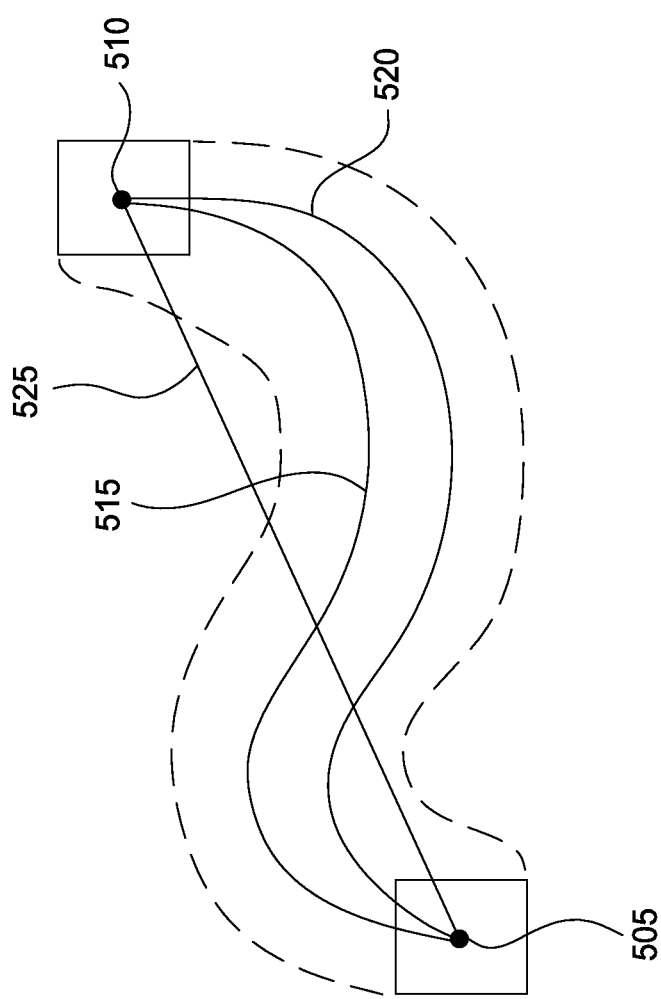
FIG. 5 illustrates an example graphical representation of a set of tolerances applied to a trajectory alert, according to one embodiment.

FIG. 5 is an example graphical representation of a set of tolerances applied to a trajectory alert, according to one embodiment. Because a trajectory takes place over a series of video frames, the machine learning engine matches trajectory-based events to an alert directive differently from behavioral events that happen at a point in the scene, and thus tolerances are also created differently. The original trajectory 515 represents a trajectory that resulted in an alert. As shown, the original trajectory 515 includes a starting point 505 and an ending point 510, with a distance 525 between the two points. In addition to these components, an alert directive for the original trajectory 515 includes a set of coordinates corresponding to the path. In one embodiment, a user may, through a graphical interface, assign tolerances to the trajectory so that future occurrences of the trajectory are not required to strictly adhere to the coordinates of original trajectory 515. By creating bounding boxes around both starting point 505 and ending point 510, the user specifies a tolerance region (represented by the region enclosed by dotted lines) for a trajectory to occur to trigger the alert directive. Thus, an object traveling on an alternate trajectory 520 triggers the alert directive because the trajectory is within the set of tolerances (shown by being within the region enclosed by the dotted lines).

Figure 6:
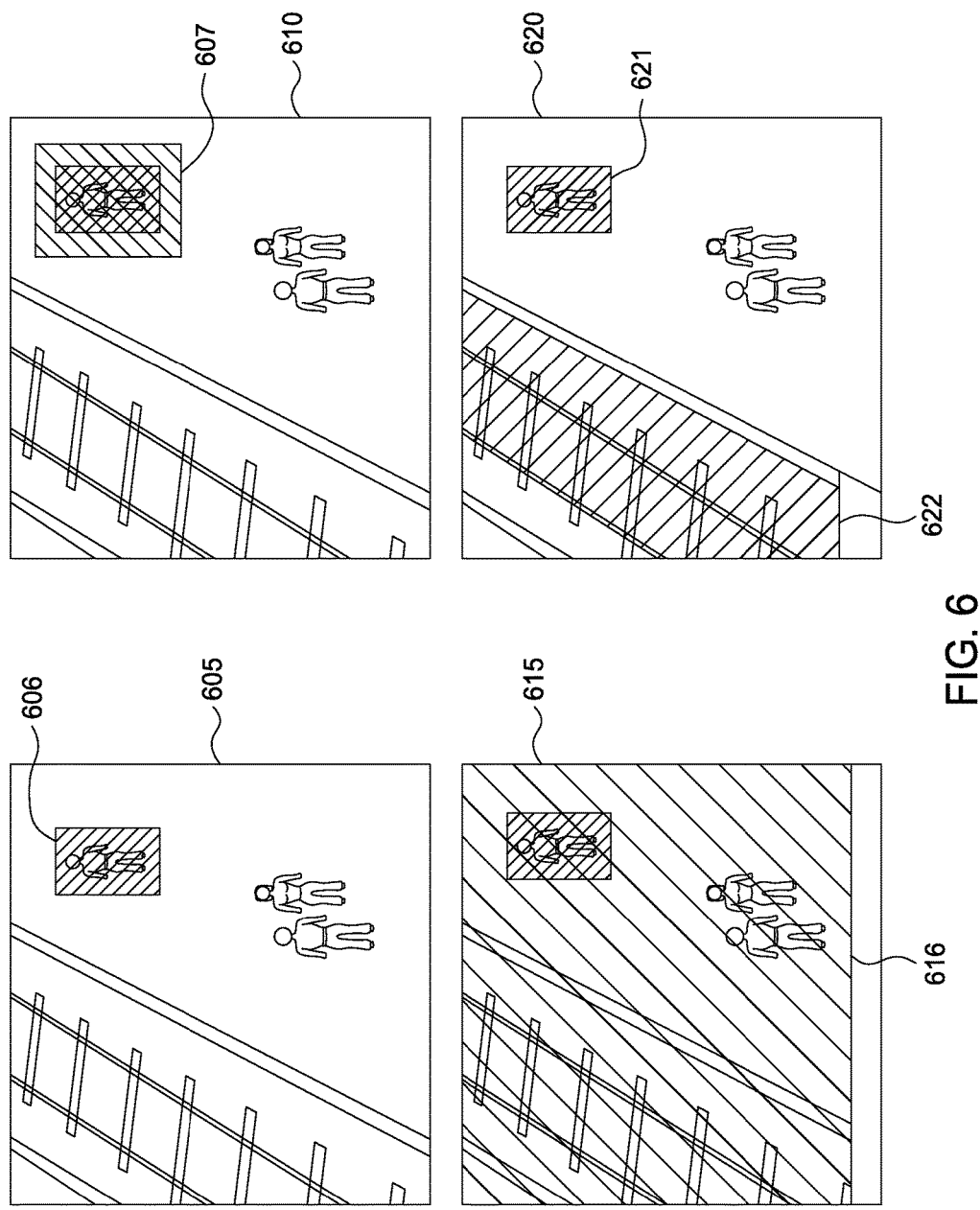
FIG. 6 illustrates an example graphical representation of an alert directive and a focused alert directive applied to a particular alert, according to one embodiment.

FIG. 6 is an example graphical representation of an alert directive and a focused alert directive applied to a particular alert within a scene, according to one embodiment. In this example, a behavioral recognition system is focused on a train platform. Images 605, 610, 615, and 620 all represent an image of the same alert provided to a user. Image 605 represents the original alert, with a bounding box 606 around a person (i.e. pixels classified by the machine learning engine as a person) who triggered the alert. For the purposes of this example, assume that the alert is an "unusual location" alert. In the behavioral recognition system, this alert data may include height and width pixel values of the object as well as the object's center (x,y) position. Image 610 represents a user creating an alert directive by drawing a wider bounding box 607 around the original alert. By creating a wider bounding box 607, the user sets larger tolerances for the machine learning engine to match when processing similar occurrences within that area. Thus, a person appearing in the shaded part of the scene depicted in the wider bounding box 607 triggers an alert directive for an "unusual location" alert.

The user may want to the same "unusual location" alert directive to apply to objects appearing within the area of the scene corresponding to railroad tracks. Accordingly, the user may create a focused alert directive to accomplish this. Images 615 and 620 represent a user creating a focused alert directive for the "unusual location" alert depicted in image 605. To create a focused alert directive from an existing alert, a user first creates a bounding box 616 over a portion where the user would like to apply a focus mask. Within that bounding box, a user can select a region (or regions), and a focus mask results from the intersection of the bounding box and the selected region(s). Thereafter, if a person wanders onto the railroad tracks in the scene, the machine learning engine processes this behavior using the focused alert directive and publishes an alert.

As described, embodiments of the present invention provide techniques of configuring a behavioral recognition system to generate an alert. More specifically, by creating alert directives (or focused alert directives) for a machine learning engine to follow, certain events always or never result in an alert. Advantageously, this approach does not impede the unsupervised learning process of the behavioral recognition system because when a behavioral event triggers an alert directive, the machine learning engine has already completed its learning process.

While the foregoing is directed to embodiments of the present disclosure, other and further embodiments of the disclosure may be devised without departing from the basic scope thereof, and the scope thereof is determined by the claims that follow.

What is claimed is:

1. A method for processing events generated from an evaluation of a stream of video frames, the method comprising:
   obtaining characteristic values for an observed event in a scene depicted by the stream of video frames;
   updating a learned state of the scene based on the characteristic values, wherein the learned state provides a model of patterns of behavior generated from evaluating a plurality of foreground objects detected in the stream of video frames;
   parsing a list of alert directives for a matching alert directive having ranges of criteria values, wherein the characteristic values are within the ranges of the criteria values and wherein the alert directive overrides a decision to either publish an alert or to not publish an alert for the observed event based on the updated learned state of the scene without changing the updated learned state of the scene; and
   upon identifying the matching alert directive, either publishing the alert or not publishing the alert according to alert directive.

2. The method of claim 1, wherein the observed event characteristic values are a pixel-height value, a pixel-width value, and an x- and y-coordinate center position of a foreground object.

3. The method of claim 1, wherein the observed event characteristic values are a set of x- and y-coordinates corresponding to a foreground object trajectory.

4. The method of claim 1, wherein the matching alert directive has a focus mask, the focus mask intersecting with a region in video frames of the scene where the observed event occurred.

5. The method of claim 1, wherein the criteria values may be adjusted in a graphical editor.

6. The method of claim 1, wherein publishing the alert regarding the observed event comprises generating one or more alerts based on the matching alert directive.

7. The method of claim 1, wherein parsing a list of alert directives for a matching alert directive comprises matching a first alert directive with an object type associated with a foreground object associated with the observed event and a behavior associated with the observed event.

8. A computer-readable storage medium storing instructions, which, when executed on a processor, performs an operation for processing events generated by a video analytics system evaluating a stream of video frames alerting a user to behavior corresponding to an alert directive, the operation comprising:
   obtaining characteristic values for an observed event in a scene, depicted by the stream of video frames;
   updating a learned state of the scene based on the characteristic values, wherein the learned state provides a model of patterns of behavior generated from evaluating a plurality of foreground objects detected in the stream of video frames;

parsing a list of alert directives for a matching alert directive having ranges of criteria values, wherein the characteristic values are within the ranges of the criteria values and wherein the alert directive overrides a decision to either publish an alert or to not publish an alert for the observed event based on the updated learned state of the scene without changing the updated learned state of the scene; and upon identifying the matching alert directive, either publishing the alert or not publishing the alert regarding the observed event according to alert directive.

9. The computer-readable storage medium of claim 8, wherein the observed event characteristic values are a pixel-height value, a pixel-width value, and an x- and y-coordinate center position of a foreground object.

10. The computer-readable storage medium of claim 8, wherein the observed event characteristic values are a set of x- and y-coordinates corresponding to a foreground object trajectory.

11. The computer-readable storage medium of claim 8, wherein the matching alert directive has a focus mask, the focus mask intersecting with a region in video frames of the scene where the observed event occurred.

12. The computer-readable storage medium of claim 8, wherein the criteria values may be adjusted in a graphical editor.

13. The computer-readable storage medium of claim 8, wherein publishing the alert for the observed event comprises generating one or more alerts based on the matching alert directive.

14. The computer-readable storage medium of claim 8, wherein parsing a list of alert directives for a matching alert directive comprises matching a first alert directive with an object type associated with a foreground object associated with the observed event and a behavior associated with the observed event.

15. A system comprising:
a processor and
a memory hosting an application, which, when executed on the processor, performs an operation for processing events generated from an evaluation of a stream of video frame, the operation comprising:

obtaining characteristic values for an observed event in a scene depicted by the stream of video frames, updating a learned state of the scene based on the characteristic values, wherein the learned state provides a model of patterns of behavior generated from evaluating a plurality of foreground objects detected in the stream of video frames, parsing a list of alert directives for a matching alert directive having ranges of criteria values, wherein the characteristic values are within the ranges of the criteria values and wherein the alert directive overrides a decision to either publish an alert or to not publish an alert for the observed event based on the updated learned state of the scene without changing the updated learned state of the scene, and upon identifying the matching alert directive, either publishing the alert or not publishing the alert regarding the observed event according to alert directive.

16. The system of claim 15, wherein the observed event characteristic values are a pixel-height value, a pixel-width value, and an x- and y-coordinate center position of a foreground object.

17. The system of claim 15, wherein the observed event characteristic values are a set of x- and y-coordinates corresponding to a foreground object trajectory.

18. The system of claim 15, wherein the matching alert directive has a focus mask, the focus mask intersecting with a region in video frames of the scene where the observed event occurred.

19. The system of claim 15, wherein the criteria values may be adjusted in a graphical editor.

20. The system of claim 15, wherein publishing the alert for the observed event comprises generating one or more alerts based on the matching alert directive.

21. The system of claim 15, wherein parsing a list of alert directives for a matching alert directive comprises matching a first alert directive with an object type associated with a foreground object associated with the observed event and a behavior associated with the observed event.

* * * * *